(12) United States Patent
Hsu et al.

(10) Patent No.: US 7,250,461 B2
(45) Date of Patent: Jul. 31, 2007

(54) ORGANIC FORMULATIONS OF CONDUCTIVE POLYMERS MADE WITH POLYMERIC ACID COLLOIDS FOR ELECTRONICS APPLICATIONS, AND METHODS FOR MAKING SUCH FORMULATIONS

(75) Inventors: Che-Hsiung Hsu, Wilmington, DE (US); Charles Douglas Macpherson, Santa Barbara, CA (US); Hjalti Skulason, Buellton, CA (US)

(73) Assignees: E. I. du Pont de Nemours and Company, Wilmington, DE (US); DuPont Displays, Inc., Santa Barbara, CA (US)

( * ) Notice: Subject to any disclaimer, the term of this patent is extended or adjusted under 35 U.S.C. 154(b) by 7 days.

(21) Appl. No.: 10/803,114

(22) Filed: Mar. 17, 2004

(65) Prior Publication Data

US 2005/0209388 A1    Sep. 22, 2005

(51) Int. Cl.
| | |
|---|---|
| C08K 3/04 | (2006.01) |
| C08K 3/20 | (2006.01) |
| C08K 3/34 | (2006.01) |
| C08K 5/22 | (2006.01) |
| C08K 5/34 | (2006.01) |
| C08K 5/53 | (2006.01) |

(52) U.S. Cl. ............... 524/445; 524/447; 524/492; 524/495; 524/500; 524/501; 524/555; 524/723; 524/726; 524/730; 524/817

(58) Field of Classification Search .......... 524/457, 524/445, 447, 492, 495, 500, 501, 555, 723, 524/726, 730, 745, 808, 812, 817
See application file for complete search history.

(56) References Cited

U.S. PATENT DOCUMENTS

| | | | |
|---|---|---|---|
| 4,552,927 A | 11/1985 | Warren | |
| 4,959,430 A | 9/1990 | Jonas et al. | |
| 5,002,700 A | 3/1991 | Otagawa et al. | |
| 5,069,820 A | 12/1991 | Jen et al. | |
| 5,160,457 A | 11/1992 | Elsenbaumer | |
| 5,185,100 A * | 2/1993 | Han et al. | 252/500 |
| 5,247,190 A | 9/1993 | Friend et al. | |
| 5,258,461 A * | 11/1993 | Facci et al. | 525/165 |
| 5,286,413 A | 2/1994 | Hannecart et al. | |
| 5,300,575 A | 4/1994 | Jonas et al. | |
| 5,317,169 A | 5/1994 | Nakano et al. | |
| 5,378,402 A | 1/1995 | Cross et al. | |
| 5,554,179 A * | 9/1996 | Stroetmann et al. | 607/129 |
| 5,705,888 A | 1/1998 | Staring et al. | |
| 5,986,400 A | 11/1999 | Staring et al. | |
| 5,994,496 A | 11/1999 | Van Haare et al. | |
| 6,205,016 B1 * | 3/2001 | Niu | 361/503 |
| 2004/0127637 A1 * | 7/2004 | Hsu et al. | 524/800 |
| 2004/0254297 A1 * | 12/2004 | Hsu et al. | 525/54.2 |
| 2005/0222333 A1 * | 10/2005 | Hsu | 525/178 |

FOREIGN PATENT DOCUMENTS

| | | |
|---|---|---|
| EP | 0 593 111 A1 * | 4/1994 |
| EP | 0 440 957 B1 | 3/1996 |
| EP | 0 817 540 A2 | 6/1997 |
| GB | 2 124 635 A | 2/1984 |

OTHER PUBLICATIONS

Pickup, Peter G. et al., Electronically Conducting Cation-exchange Polymer Powders: Synthesis, Characterization and Applications in PEM Fuel Cells and Supercapacitors, Journal of New Materials for Electrochemical Systems, Nov. 1999, pp. 21-26, 3.*
Hsu, C.-H., Novel Preparation and Properties of Conductive Polyaniline/Nafion(R) Film, Synthetic Metals, 1991, 671-674, 41-43, Elsevier Sequoia, The Netherlands.
A. J. Sharpe, Jr. et al., Improved Cationic Conductive Polymer, Calgon Corp., Pittsburgh, PA, Coating Conference [Proceedings], pp. 83-87, 1981, ISSN 0364-2771.

* cited by examiner

*Primary Examiner*—Kriellion Sanders
(74) *Attorney, Agent, or Firm*—John H. Lamming

(57) ABSTRACT

Organic compositions of conductive polymers are provided. The compositions have at least one polymer selected from polypyrrole, polythiophene, or combinations and at least one colloid-forming polymeric acid dispersed in a liquid medium that is at least 60% by weight at least one organic liquid. Also provided is a method of making such compositions.

22 Claims, 1 Drawing Sheet

ORGANIC FORMULATIONS OF CONDUCTIVE POLYMERS MADE WITH POLYMERIC ACID COLLOIDS FOR ELECTRONICS APPLICATIONS, AND METHODS FOR MAKING SUCH FORMULATIONS

FIELD OF THE INVENTION

The invention relates to electrically conducting polymers of pyrrole or thiophene, wherein the electrically conducting polymer is synthesized in the presence of polymeric acid colloids and further dispersed in an organic liquid.

BACKGROUND OF THE INVENTION

Electrically conducting polymers have been used in a variety of organic electronic devices, including in the development of electroluminescent ("EL") devices for use in light emissive displays. With respect to EL devices, such as organic light emitting diodes (OLEDs) containing conducting polymers, such devices generally have the following configuration:

anode/buffer layer/EL material/cathode

The anode is typically any material that is transparent and has the ability to inject holes into the EL material, such as, for example, indium/tin oxide (ITO). The anode is optionally supported on a glass or plastic substrate. EL materials include fluorescent dyes, fluorescent and phosphorescent metal complexes, conjugated polymers, and mixtures thereof. The cathode is typically any material (such as, e.g., Ca or Ba) that has the ability to inject electrons into the EL material.

The buffer layer is typically an electrically conducting polymer and facilitates the injection of holes from the anode into the EL material layer. The buffer layer can also be called a hole-injection layer, a hole transport layer, or may be characterized as part of a bilayer anode. Typical conducting polymers employed as buffer layers include polyaniline and polydioxythiophenes such as poly(3,4-ethylenedioxythiophene) (PEDT). These materials can be prepared by polymerizing aniline or dioxythiophene monomers in aqueous solution in the presence of a water soluble polymeric acid, such as poly(styrenesulfonic acid) (PSS), as described in, for example, U.S. Pat. No. 5,300,575 entitled "Polythiophene dispersions, their production and their use." A well known PEDT/PSS material is Baytron®-P, commercially available from H. C. Starck, GmbH (Leverkusen, Germany).

The aqueous electrically conductive polymer dispersions synthesized with water soluble polymeric sulfonic acids have undesirable low pH levels. The low pH can contribute to decreased stress life of an EL device containing such a buffer layer, and contribute to corrosion within the device. Accordingly, there is a need for compositions and layers prepared there from having improved properties.

Electrically conducting polymers which have the ability to carry a high current when subjected to a low electrical voltage, also have utility as electrodes for electronic devices, such as thin film field effect transistors. In such transistors, an organic semiconducting film which has high mobility for electron and/or hole charge carriers, is present between source and drain electrodes. A gate electrode is on the opposite side of the semiconducting polymer layer. To be useful for the electrode application, the electrically conducting polymers and the liquids for dispersing or dissolving the electrically conducting polymers have to be compatible with the semiconducting polymers and the solvents for the semiconducting polymers to avoid re-dissolution of either conducting polymers or semiconducting polymers. The electrical conductivity of the electrodes fabricated from the electrically conducting polymers should be greater than 10 S/cm (where S is a reciprocal ohm). However, the electrically conducting polythiophenes made with a polymeric acid typically provide conductivity in the range of ~$10^{-3}$ S/cm or lower. In order to enhance conductivity, conductive additives may be added to the polymer. However, the presence of such additives can deleteriously affect the processability of the electrically conducting polythiophene. Accordingly, there is a need for improved conductive polythiophenes.

There is a continuing need for conductive polymer compositions having improved physical and electrical properties.

SUMMARY OF THE INVENTION

New compositions are provided comprising at least one polymer selected from at least one polypyrrole, at least one polythiophene, or mixtures of two such polymers and at least one colloid-forming polymeric acid, and at least one organic liquid.

The new invention compositions are useful in electrically active layers of organic electronic devices, for example in a variety of organic electronic devices, and as a buffer layer in organic light emitting diodes (OLEDs).

In another embodiment, a method is provided for producing such new compositions, said method comprising:

polymerizing at least one monomer selected from pyrrole monomers, and thiophene monomers, and mixtures thereof in the presence of at least one colloid-forming polymeric acid in an aqueous liquid medium to form an aqueous dispersion, removing an amount of the aqueous liquid medium from the aqueous dispersion to form partially dried solids, and dispersing the partially dried solids in an organic liquid.

In another embodiment, electronic devices comprising at least one layer made from the new composition are provided.

The foregoing general description and the following detailed description are exemplary and explanatory only and are not restrictive of the invention, as defined in the appended claims.

BRIEF DESCRIPTION OF THE FIGURES

The invention is illustrated by way of example and not limitation in the accompanying figures.

DETAILED DESCRIPTION OF THE INVENTION

Figure 1:
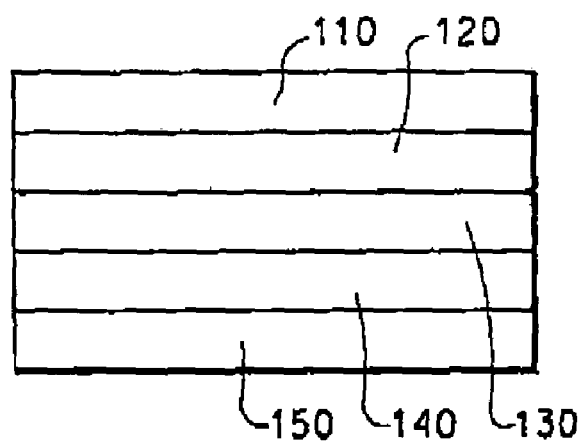
FIG. 1 illustrates one use of the new composition and is a cross-sectional view of an electronic device that includes one layer comprising the new composition, in this example a buffer layer.

New compositions are provided comprising at least one polymer selected from a polypyrrole, a polythiophene, and mixtures of two such polymers, at least one colloid-forming polymeric acid, and at least one organic liquid.

In one embodiment, the new composition comprises an organic liquid which has a boiling point greater than about 100° C.

In one embodiment of the invention, the composition comprises a polymer selected from at least one of a polypyrrole, a polythiophene, and a combination of such polymers, and at least one colloid-forming polymeric acid dispersed in a liquid medium comprising at least 60% by weight of an organic liquid. In another embodiment, the organic liquid is 80 to 90% by weight of the liquid medium. In one embodiment, the new composition further comprises at least one material selected from a conductive additive, a co-dispersing agent, a co-acid, and mixtures thereof.

As used herein, the term "dispersion" refers to a continuous liquid medium containing a suspension of minute particles. In accordance with the invention, the "continuous medium" may be an aqueous liquid, e.g., water, mixture of water/organic liquid or predominantly an organic liquid. As used herein, the term "colloid" refers to the minute particles suspended in the continuous medium, said particles having a nanometer-scale particle size. As used herein, the term "colloid-forming" refers to substances that form minute particles when dispersed in aqueous solution, i.e., "colloid-forming" polymeric acids are not water-soluble.

As used herein, the term "alkyl" refers to a group derived from an aliphatic hydrocarbon and includes linear, branched and cyclic groups which may be unsubstituted or substituted. The term "heteroalkyl" is intended to mean an alkyl group, wherein one or more of the carbon atoms within the alkyl group has been replaced by another atom, such as nitrogen, oxygen, sulfur, and the like. The term "alkylene" refers to an alkyl group having two points of attachment.

As used herein, the term "alkenyl" refers to a group derived from an aliphatic hydrocarbon having at least one carbon-carbon double bond, and includes linear, branched and cyclic groups which may be unsubstituted or substituted. The term "heteroalkyl" is intended to mean an alkenyl group, wherein one or more of the carbon atoms within the alkenyl group has been replaced by another atom, such as nitrogen, oxygen, sulfur, and the like. The term "alkenylene" refers to an alkenyl group having two points of attachment.

As used herein, the following terms for substituent groups refer to the formulae given below:

| | |
|---|---|
| "alcohol" | —$R^3$—OH |
| "amidosulfonate" | —$R^3$—C(O)N($R^6$)$R^4$—$SO_3$Z |
| "benzyl" | —$CH_2$—$C_6H_5$ |
| "carboxylate" | —$R^3$—C(O)O—Z |
| "ether" | —$R^3$—O—$R^5$ |
| "ether carboxylate" | —$R^3$—O—$R^4$—C(O)O—Z |
| "ether sulfonate" | —$R^3$—O—$R^4$—$SO_3$Z |
| "sulfonate" | —$R^3$—$SO_3$Z |
| "urethane" | —$R^3$—O—C(O)—N($R^6$)$_2$ | where all "R" groups are the same or different at each occurrence and:
  $R^3$ is a single bond or an alkylene group
  $R^4$ is an alkylene group
  $R^5$ is an alkyl group
  $R^6$ is hydrogen or an alkyl group
  Z is H, alkali metal, alkaline earth metal, N($R^5$)$_4$ or $R^5$ Any of the above groups may further be unsubstituted or substituted, and any group may have F substituted for one or more hydrogens, including perfluorinated groups.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, use of the "a" or "an" are employed to describe elements and components of the invention. This is done merely for convenience and to give a general sense of the invention. This description should be read to include one or at least one and the singular also includes the plural unless it is obvious that it is meant otherwise.

Polypyrroles contemplated for use the new composition have Formula I below.

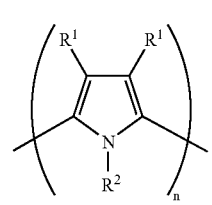

where in Formula I:
  n is at least about 4;
  $R^1$ is independently selected so as to be the same or different at each occurrence and is selected from hydrogen, alkyl, alkenyl, alkoxy, alkanoyl, alkythio, aryloxy, alkylthioalkyl, alkylaryl, arylalkyl, amino, alkylamino, dialkylamino, aryl, alkylsulfinyl, alkoxyalkyl, alkylsulfonyl, arylthio, arylsulfinyl, alkoxycarbonyl, arylsulfonyl, acrylic acid, phosphoric acid, phosphonic acid, halogen, nitro, cyano, hydroxyl, epoxy, silane, siloxane, alcohol, amidosulfonate, benzyl, carboxylate, ether, ether carboxylate, ether sulfonate, and urethane; or both $R^1$ groups together may form an alkylene or alkenylene chain completing a 3, 4, 5, 6, or 7-membered aromatic or alicyclic ring, which ring may optionally include one or more divalent nitrogen, sulfur or oxygen atoms; and
  $R^2$ is independently selected so as to be the same or different at each occurrence and is selected from hydrogen, alkyl, alkenyl, aryl, alkanoyl, alkylthioalkyl, alkylaryl, arylalkyl, amino, epoxy, silane, siloxane, alcohol, amidosulfonate, benzyl, carboxylate, ether, ether carboxylate, ether sulfonate, sulfonate, and urethane.

In one embodiment, $R^1$ is the same or different at each occurrence and is independently selected from hydrogen, alkyl, alkenyl, alkoxy, cycloalkyl, cycloalkenyl, alcohol, amidosulfonate, benzyl, carboxylate, ether, ether carboxylate, ether sulfonate, sulfonate, urethane, epoxy, silane, siloxane, and alkyl substituted with one or more of sulfonic acid, carboxylic acid, acrylic acid, phosphoric acid, phosphonic acid, halogen, nitro, cyano, hydroxyl, epoxy, silane, or siloxane moieties.

In one embodiment, $R^2$ is selected from hydrogen, alkyl, and alkyl substituted with one or more of sulfonic acid, carboxylic acid, acrylic acid, phosphoric acid, phosphonic acid, halogen, cyano, hydroxyl, epoxy, silane, or siloxane moieties.

In one embodiment, the polypyrrole is unsubstituted and both $R^1$ and $R^2$ are hydrogen.

In one embodiment, both $R^1$ together form a 6- or 7-membered alicyclic ring, which is further substituted with a group selected from alkyl, heteroalkyl, alcohol, amidosulfonate, benzyl, carboxylate, ether, ether carboxylate, ether sulfonate, sulfonate, and urethane. These groups can improve the solubility of the monomer and the resulting polymer. In one embodiment, both $R^1$ together form a 6- or 7-membered alicyclic ring, which is further substituted with an alkyl group. In one embodiment, both $R^1$ together form a 6- or 7-membered alicyclic ring, which is further substituted with an alkyl group having at least 1 carbon atom.

In one embodiment, both $R^1$ together form —O—$(CHY)_m$—O—, where m is 2 or 3, and Y is the same or different at each occurrence and is selected from hydrogen, alkyl, alcohol, amidosulfonate, benzyl, carboxylate, ether, ether carboxylate, ether sulfonate, sulfonate, and urethane. In one embodiment, at least one Y group is not hydrogen. In one embodiment, at least one Y group is a substituent having F substituted for at least one hydrogen. In one embodiment, at least one Y group is perfluorinated.

In one embodiment, the polypyrrole used in the new composition is a positively charged conductive polymer where the positive charges are balanced by the colloidal polymeric acid anions.

Polythiophenes contemplated for use in the new composition have Formula II below:

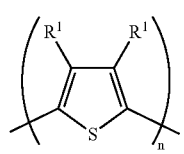

(II)

wherein:
$R^1$ is independently selected so as to be the same or different at each occurrence and is selected from hydrogen, alkyl, alkenyl, alkoxy, alkanoyl, alkythio, aryloxy, alkylthioalkyl, alkylaryl, arylalkyl, amino, alkylamino, dialkylamino, aryl, alkylsulfinyl, alkoxyalkyl, alkylsulfonyl, arylthio, arylsulfinyl, alkoxycarbonyl, arylsulfonyl, acrylic acid, phosphoric acid, phosphonic acid, halogen, nitro, cyano, hydroxyl, epoxy, silane, siloxane, alcohol, amidosulfonate, benzyl, carboxylate, ether, ether carboxylate, ether sulfonate, and urethane; or both $R^1$ groups together may form an alkylene or alkenylene chain completing a 3, 4, 5, 6, or 7-membered aromatic or alicyclic ring, which ring may optionally include one or more divalent nitrogen, sulfur or oxygen atoms, and
n is at least about 4.

In one embodiment, both $R^1$ together form —O—$(CHY)_m$—O—, where m is 2 or 3, and Y is the same or different at each occurrence and is selected from hydrogen, alkyl, alcohol, amidosulfonate, benzyl, carboxylate, ether, ether carboxylate, ether sulfonate, sulfonate, and urethane. In one embodiment, all Y are hydrogen. In one embodiment, the polythiophene is poly(3,4-ethylenedioxythiophene). In one embodiment, at least one Y group is not hydrogen. In one embodiment, at least one Y group is a substituent having F substituted for at least one hydrogen. In one embodiment, at least one Y group is perfluorinated.

In one embodiment, the polythiophene is a poly[(sulfonic acid-propylene-ether-methylene-3,4-dioxyethylene)thiophene]. In one embodiment, the polythiophene is a poly[(propyl-ether-ethylene-3,4-dioxyethylene)thiophene].

The polymers suitable for the new composition can be homopolymers, or the can be co-polymers of two or more respective monomers. The composition may further comprise one or more different polymers, one or more colloid-forming acid.

Colloid-forming polymeric acids contemplated for use in the practice of the invention are insoluble in water, and form colloids when dispersed into an aqueous medium. The polymeric acids typically have a molecular weight in the range of about 10,000 to about 4,000,000. In one embodiment, the polymeric acids have a molecular weight of about 100,000 to about 2,000,000. Colloid particle size typically ranges from 2 nanometers (nm) to about 140 nm. In one embodiment, the polymer acid colloids have a particle size of about 2 nm to about 30 nm. Any polymeric acid that is colloid-forming when dispersed in water is suitable for use in the practice of the invention. In one embodiment, the colloid-forming polymeric acid is polymeric sulfonic acid. Other acceptable polymeric acids include polymeric phosphoric acids, polymeric phosphonic acids, polymeric carboxylic acids, polymeric acrylic acids, and mixtures thereof, including mixtures having polymeric sulfonic acids. In another embodiment, the polymeric sulfonic acid is fluorinated. In still another embodiment, the colloid-forming polymeric sulfonic acid is perfluorinated. In yet another embodiment, the colloid-forming polymeric sulfonic acid is a perfluoroalkylenesulfonic acid.

In still another embodiment, the colloid-forming polymeric acid is a highly-fluorinated sulfonic acid polymer ("FSA polymer"). "Highly fluorinated" means that at least about 50% of the total number of halogen and hydrogen atoms in the polymer are fluorine atoms, and in one embodiment at least about 75%, and in another embodiment at least about 90%. In another embodiment, the polymer is perfluorinated. The term "sulfonate functional group" refers to either to sulfonic acid groups or salts of sulfonic acid groups, and in one embodiment alkali metal or ammonium salts. The functional group is represented by the formula —$SO_3X$ where X is a cation, also known as a "counterion". X may be H, Li, Na, K or $N(R_1)(R_2)(R_3)(R_4)$, and $R_1$, $R_2$, $R_3$, and $R_4$ are the same or different and are in one embodiment H, $CH_3$ or $C_2H_5$. In one embodiment, X is H, in which case the polymer is said to be in the "acid form". X may also be multivalent, as represented by such ions as $Ca^{++}$, and $Al^{+++}$. It is clear to the skilled artisan that in the case of multivalent counterions, represented generally as $M^{n+}$, the number of sulfonate functional groups per counterion will be equal to the valence "n".

In one embodiment, the FSA polymer comprises a polymer backbone with recurring side chains attached to the backbone, the side chains carrying cation exchange groups. Polymers include homopolymers or copolymers of two or more monomers. Copolymers are typically formed from a nonfunctional monomer and a second monomer carrying the cation exchange group or its precursor, e.g., a sulfonyl fluoride group (—$SO_2F$), which can be subsequently hydrolyzed to a sulfonate functional group. For example, copolymers of a first fluorinated vinyl monomer together with a second fluorinated vinyl monomer having a sulfonyl fluoride group (—$SO_2F$) can be used. Possible first monomers include tetrafluoroethylene (TFE), hexafluoropropylene, vinyl fluoride, vinylidine fluoride, trifluoroethylene, chlorotrifluoroethylene, perfluoro(alkyl vinyl ether), and combinations thereof. TFE is a preferred first monomer.

In one embodiment, at least one monomer comprising fluorinated vinyl ethers with sulfonate functional groups or precursor groups which can provide the desired side chain in the polymer. Additional monomers, including ethylene, propylene, and R'—CH=CH$_2$ where R' is a perfluorinated alkyl group of 1 to 10 carbon atoms, can be incorporated into these polymers if desired. The polymers may be of the type referred to herein as random copolymers, that is copolymers made by polymerization in which the relative concentrations of the comonomers are kept as constant as possible, so that the distribution of the monomer units along the polymer chain is in accordance with their relative concentrations and relative reactivities. Less random copolymers, made by varying relative concentrations of monomers in the course of the polymerization, may also be used. Polymers of the type called block copolymers, such as that disclosed in European Patent Application No. 1 026 152 A1, may also be used.

In one embodiment, the FSA polymers for use in the present invention include a highly fluorinated, including those that are perfluorinated, carbon backbone and side chains represented by the formula

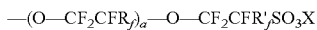
—(O—CF$_2$CFR$_f$)$_a$—O—CF$_2$CFR'$_f$SO$_3$X wherein R$_f$ and R'$_f$ are independently selected from F, Cl or a perfluorinated alkyl group having 1 to 10 carbon atoms, a=0, 1 or 2, and X is H, Li, Na, K or N(R1)(R2)(R3)(R4) and R1, R2, R3, and R4 are the same or different and in one embodiment are H, CH$_3$ or C$_2$H$_5$. In another embodiment X is H. As stated above, X may also be multivalent.

The preferred FSA polymers include, for example, polymers disclosed in U.S. Pat. No. 3,282,875 and in U.S. Pat. Nos. 4,358,545 and 4,940,525. An example of preferred FSA polymer comprises a perfluorocarbon backbone and the side chain represented by the formula

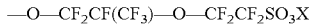
—O—CF$_2$CF(CF$_3$)—O—CF$_2$CF$_2$SO$_3$X where X is as defined above. FSA polymers of this type are disclosed in U.S. Pat. No. 3,282,875 and can be made by copolymerization of tetrafluoroethylene (TFE) and the perfluorinated vinyl ether CF$_2$=CF—O—CF$_2$CF(CF$_3$)—O—CF$_2$CF$_2$SO$_2$F, perfluoro(3,6-dioxa-4-methyl-7-octenesulfonyl fluoride) (PDMOF), followed by conversion to sulfonate groups by hydrolysis of the sulfonyl fluoride groups and ion exchanged as necessary to convert them to the desired ionic form. An example of a preferred polymer of the type disclosed in U.S. Pat. Nos. 4,358,545 and 4,940,525 has the side chain —O—CF$_2$CF$_2$SO$_3$X, wherein X is as defined above. This polymer can be made by copolymerization of tetrafluoroethylene (TFE) and the perfluorinated vinyl ether CF$_2$=CF—O—CF$_2$CF$_2$SO$_2$F, perfluoro(3-oxa4-pentene-sulfonyl fluoride) (POPF), followed by hydrolysis and further ion exchange as necessary.

The FSA polymers for use in this invention have an ion exchange ratio of less than about 33. In this application, "ion exchange ratio" or "IXR" is defined as number of carbon atoms in the polymer backbone in relation to the cation exchange groups. Within the range of less than about 33, IXR can be varied as desired for the particular application. With most polymers, the IXR is about 3 to about 33, and in one embodiment about 8 to about 23.

The cation exchange capacity of a polymer is often expressed in terms of equivalent weight (EW). For the purposes of this application, equivalent weight (EW) is defined to be the weight of the polymer in acid form required to neutralize one equivalent of sodium hydroxide. In the case of a sulfonate polymer where the polymer has a perfluorocarbon backbone and the side chain is —O—CF$_2$—CF(CF$_3$)—O—CF$_2$—CF$_2$—SO$_3$H (or a salt thereof), the equivalent weight range which corresponds to an IXR of about 8 to about 23 is about 750 EW to about 1500 EW. IXR for this polymer can be related to equivalent weight using the formula: 50 IXR+344=EW. While the same IXR range is used for sulfonate polymers disclosed in U.S. Pat. Nos. 4,358,545 and 4,940,525, e.g., the polymer having the side chain —O—CF$_2$CF$_2$SO$_3$H (or a salt thereof), the equivalent weight is somewhat lower because of the lower molecular weight of the monomer unit containing a cation exchange group. For the preferred IXR range of about 8 to about 23, the corresponding equivalent weight range is about 575 EW to about 1325 EW. IXR for this polymer can be related to equivalent weight using the formula: 50 IXR+178=EW.

The synthesis of FSA polymers is well known. The FSA polymers can be prepared as colloidal aqueous dispersions. They may also be in the form of dispersions in other media, examples of which include, but are not limited to, alcohol, water-soluble ethers, such as tetrahydrofuran, mixtures of water-soluble ethers, and combinations thereof. In making the dispersions, the polymer can be used in aQid form. U.S. Pat. Nos. 4,433,082, 6,150,426 and WO 03/006537 disclose methods for making of aqueous alcoholic dispersions. After the dispersion is made, concentration and the dispersing liquid composition can be adjusted by methods known in the art.

In one embodiment, aqueous dispersions of the colloid-forming polymeric acids, including FSA polymers, have particle sizes as small as possible and an EW as small as possible, so long as a stable colloid is formed.

Aqueous dispersions of FSA polymer are available commercially as Nafion® dispersions, from E. I. du Pont de Nemours and Company (Wilmington, Del.).

In one embodiment, the new composition comprises at least one polymer selected from polythiophenes, polypyrroles, and mixtures thereof, at least one colloid forming polymeric acid, and at least a substantial amount of the liquid portion of the composition is at least one organic liquid. Mixtures of two or more organic liquids can be present. In one embodiment, the amount of water or water/co-dispersing liquid from polymerization present in the liquid medium is about 1 to 40% by weight. In one embodiment, the amount of water or water/co-dispersing liquid from polymerization present in the liquid medium is about 2 to 20% by weight.

The organic liquid used in the new composition is one which is miscible with water. Examples of suitable organic liquids include, but are not limited to glycols, glycol ethers, alcohols, alcohol ethers, cyclic ethers, ketones, nitriles, sulfoxides, amides, and combinations thereof. In one embodiment, the organic liquid has a boiling point greater than about 100° C. In one embodiment, the organic liquid is selected from glycols, glycol ethers, cyclic ethers, sulfoxides, amides, and combinations thereof. In one embodiment, the organic liquid is selected from N-methylpyrrolidone, ethylene glycol, dimethylacetamide, dimethyl formamide, dimethylsulfoxide, and combinations thereof.

The formulations of polymers in accordance with this new composition are formed by first synthesizing a thiophene or pyrrole polymer in the presence of an aqueous colloid-forming polymeric acid dispersion to form a stable aqueous dispersion of conducting polymer/polymeric acid colloids;

removing about 60 to 99% by weight of the water to form still wet particles of the new composition; and redispersing the conducting polymer/polymeric acid colloid particles in at least one organic liquid.

The electrically conducting polymers employed in invention methods are typically prepared by oxidatively polymerizing pyrrole or thiophene monomers in an aqueous colloid-forming polymeric acid dispersion in the presence of an oxidizing agent, such as ammonium persulfate (APS), sodium persulfate, potassium persulfate and the like and a catalyst, optionally for pyrroles, such as ferric chloride, ferric sulfate, and the like. The oxidative polymerization results in a stable, aqueous dispersion containing positively charged conductive polymeric pyrrole or thiophene that is charge balanced by the negatively charged side chains of the polymeric acids contained within the colloids; for example, sulfonate anion, carboxylate anion, acetylate anion, phosphonate anion, phosphate anion, and combinations, and the like.

The method of making an aqueous dispersion of at least one polypyrrole, polythioipene or mixtures thereof and at least one colloid-forming polymeric acid includes forming a reaction mixture by combining water, pyrrole and/or thiophene monomer (hereinafter referred to either individually or collectively as "Monomer" as appropriate for the particular new composition), colloid-forming polymeric acid, and oxidizer, in any order, provided that at least a portion of the colloid-forming polymeric acid is present when at least one of the Monomer and the oxidizer is added.

The pyrrole monomer generally has Formula Ia below

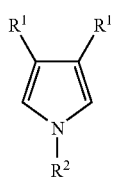

(Ia)

where $R^1$ and $R^2$ are as defined above.

The thiophene monomer generally has Formula IIa below

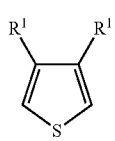

(IIa)

where $R^1$ is as defined above.

In one embodiment, the method of making the new composition comprises:
(a) providing an aqueous dispersion of a colloid-forming polymeric acid;
(b) adding an oxidizing agent to the dispersion of step (a); and
(c) adding at least one Monomer to the dispersion of step (b).

In another embodiment, the Monomer is added to the aqueous dispersion of the colloid-forming polymeric acid prior to adding the oxidizer. Step (b) above, which is adding oxidizing agent, is then carried out.

In one embodiment a composition comprising both polypyrrole and polythiopene is formed, and the method to achieve this embodiment comprises performing the polymerizations separately for the at least one pyrrole monomer from the at least thiophene monomer.

In another embodiment, a mixture of water and the Monomer is formed, in a concentration typically in the range of about 0.5% by weight to about 4.0% by weight Monomer. This Monomer mixture is added to the aqueous dispersion of the colloid-forming polymeric acid, and step (b) above which is adding oxidizing agent is carried out.

In another embodiment, the aqueous polymerization dispersion may comprise a polymerization catalyst, such as ferric sulfate, ferric chloride, and the like. The catalyst is added before the step (b). In another embodiment, a catalyst is added together with an oxidizing agent.

In one embodiment, a co-dispersing liquid can be added at any point in the polymerization. The co-dispersing liquid is added to reduce aggregation of electrically conducting particles. In one embodiment, suitable liquids include, but are not limited to, glycols, glycol ethers, ethers, alcohols, alcohol ethers, cyclic ethers, ketones, nitrites, sulfoxides, amides, and combinations thereof.

In one embodiment, the reaction mixture may further comprise a co-dispersing agent, a co-acid, or mixtures thereof.

In one embodiment, the Monomers are combined with the aqueous reaction mixture comprising colloid-forming polymeric acid particles, the oxidizing agent and the catalyst dispersed therein by dispensing the Monomers in a controlled rate of addition while continuously mixing the reaction mixture to form a monomer-meniscus in the reaction mixture.

In one embodiment, the oxidizing agent predissolved in water is combined with the aqueous reaction mixture comprising colloid-forming polymeric acid particles, Monomer and the catalyst therein by dispensing the oxidizing agent solution in a controlled rate of addition while continuously mixing the reaction mixture.

In one embodiment, the oxidizing agent and the Monomer are added separately and simultaneously to the reaction mixture, at the same or different controlled rates of addition, to achieve the final desired quantity of oxidizing agent, so as to consume the monomer at a controlled rate in the oxidative polymerization reaction.

In one embodiment, the controlled rate of addition of thiophene monomer is determined in view of the quantity of materials used, with the goal of controlling the rate of monomer addition from the dispensing mechanism to ensure dissolution in the reaction mixture quickly. With the controlled addition, the polymerization and oxidation chemistry take place in an even and uniform manner. Examples of the dispensing mechanism include, but are not limited to, use of tubing, syringes, pipettes, nozzle guns, sprayers, hoses, pipes and the like. In one embodiment, a perforated end, such as fitted-glass plate, or small diameter tubing attached to the equipment described above is used for creating a monomer-meniscus in the reaction mixture.

The rate of addition depends upon the size of the reaction, the speed at which the solution is stirred and the geometry and number of the dispensing end of the dispensing mechanism orifice. In one embodiment, the dispensing end of the dispensing mechanism is submerged in the reaction mixture containing the aqueous colloid-forming polymeric acid. For example, addition rates of thiophene monomer of about 1-1000 micro liter per hour for a reaction mixture size of about 100-500 grams of aqueous colloid-forming polymeric acid composition. In one embodiment the rate of addition is between about 5-100 micro liters per hour for about 500 grams of the aqueous colloid-forming polymeric acid. For reaction mixtures of other sizes (larger or smaller) the rate of addition can be linearly scaled in the appropriate direction.

Polymerization catalysts include, but are not limited to, ferric sulfate ferric chloride, other materials having a higher oxidation potential than the oxidizing agent, and mixtures thereof.

Oxidizing agents include, but are not limited to, sodium persulfate, potassium persulfate, ammonium persulfate, and the like, including combinations thereof. In one embodiment, the oxidative polymerization results in a stable, aqueous dispersion containing positively charged conductive polymeric thiophene that is charge balanced by the negatively charged side chains of the polymeric acids contained within the colloids, for example, sulfonate anion, carboxylate anion, acetylate anion, phosphate anion, phosphonate anion, combinations, and the like.

In one embodiment, the polymerization is carried out in the presence of a co-acid. The acid can be an inorganic acid, such as HCl, sulfuric acid, and the like, or an organic acid, such as acetic acid, p-toluenesulfonic acid, dodecylbenzenesulfonic acid, methanesulfonic acid, trifluoromethanesulfonic acid, camphorsulfonic acid, and the like. Alternatively, the acid can be a water soluble polymeric acid such as poly(styrenesulfonic acid), poly(2-acrylamido-2-methyl-1-propanesulfonic acid, or the like, or a second colloid-forming acid, as described above. Combinations of acids can be used.

The co-acid can be added to the reaction mixture at any point in the process prior to the addition of either the oxidizer or the Monomer, whichever is added last. In one embodiment, the co-acid is added before both the Monomer and the colloid-forming polymeric acid, and the oxidizer is added last. In one embodiment the co-acid is added prior to the addition of the Monomer, followed by the addition of the colloid-forming polymeric acid, and the oxidizer is added last.

In one embodiment, a co-dispersing liquid is combined with a co-acid in the as-made dispersions of polythiophene, polypyrrole or mixtures thereof.

In the method of making the new composition comprising of at least one polypyrrole, polythoipene or mixtures thereof and at least one colloid-forming polymeric acid, the molar ratio of oxidizer to Monomer is generally in the range of 0.1 to 2.0; and in one embodiment is 0.4 to 1.5. The molar ratio of colloid-forming polymeric acid to Monomer is generally in the range of 0.2 to 5. In one embodiment, the ratio is in the range of 1 to 4. The overall solid content is generally in the range of about 1.0% to 10% in weight percentage; and in one embodiment of about 2% to 4.5%. The reaction temperature is generally in the range of about 4° C. to 50° C.; in one embodiment about 20° C. to 35° C. The molar ratio of optional co-acid to Monomer is about 0.05 to 4. The reaction time is generally in the range of about 1 to about 30 hours.

Water or water and co-dispersing liquid in the dispersions of polythiophene, polypyrrole or mixtures thereof is then removed from the dispersion to form still wet (partially dried) conductive polymer/polymeric acid solids. This can be done by any conventional means including, but not limited to, evaporation, centrifuging, precipitation, and extraction. The amount of water or water/co-dispersing liquid mixture removed is in the range of 60 to 99%, by weight of the composition prior to their removal. In one embodiment, 80 to 98% by weight water is removed. In one embodiment, the liquid is not removed to the point of substantial dryness of the solids.

The partially dried conductive polymer/polymeric acid solids are then dispersed in an organic liquid to form an organic formulation of conductive polymer/polymeric acid. In one embodiment, the organic liquid is a high boiling liquid. The amount of solids in the liquid medium is generally in the range of 1 to 10% by weight.

In one embodiment, the organic suitable high boiling organic liquids include, but are not limited to, glycols, glycol ethers, ethers alcohols, alcohol ethers, cyclic ethers, ketones, nitrites, sulfoxides, amides, and combinations thereof. In one embodiment, the liquid has a boiling point of greater than about 100° C.

In one embodiment, the conductive polymer/polymeric acid upon completion of polymerization, is contacted with at least one ion exchange resin to quench polymerization, remove impurities and adjustment of pH. This can be carried out after completion of the polymerization reaction in the aqueous dispersion, or the organic formulation can be treated. The aqueous dispersion can be treated under conditions suitable to remove decomposed species, side reaction products, ionic impurities, and unreacted monomers, and to adjust pH, thus producing a stable, aqueous dispersion with a desired pH. In one embodiment, the aqueous dispersion is contacted with a first ion exchange resin and a second ion exchange resin, in any order. The aqueous dispersion can be treated with both the first and second ion exchange resins simultaneously, or it can be treated sequentially with one and then the other.

Ion exchange is a reversible chemical reaction wherein an ion in a fluid medium (such as an aqueous dispersion) is exchanged for a similarly charged ion attached to an immobile solid particle that is insoluble in the fluid medium. The term "ion exchange resin" is used herein to refer to all such substances. The resin is rendered insoluble due to the crosslinked nature of the polymeric support to which the ion exchanging groups are attached. Ion exchange resins are classified as cation exchangers or anion exchangers. Cation exchangers have positively charged mobile ions available for exchange, typically protons or metal ions such as sodium ions. Anion exchangers have exchangeable ions which are negatively charged, typically hydroxide ions.

In one embodiment, the first ion exchange resin is a cation, acid exchange resin which can be in protonic or metal ion, typically sodium ion, form. The second ion exchange resin is a basic, anion exchange resin. Both acidic, cation including proton exchange resins and basic, anion exchange resins are contemplated for use in the practice of the invention.

In one embodiment, the acidic, cation exchange resin is an organic acid, cation exchange resin, such as a sulfonic acid cation exchange resin. Sulfonic acid cation exchange resins contemplated for use in the practice of the invention include, for example, sulfonated styrene-divinylbenzene copolymers, sulfonated crosslinked styrene polymers, phenol-formaldehyde-sulfonic acid resins, benzene-formaldehyde-sulfonic acid resins, and mixtures thereof. In another embodiment, the acidic, cation exchange resin is an organic acid, cation exchange resin, such as carboxylic acid, acrylic or phosphoric acid cation exchange resin. In addition, mixtures of different cation exchange resins can be used. In many cases, the basic ion exchange resin can be used to adjust the pH to the desired level. In some cases, the pH can be further adjusted with an aqueous basic solution such as a solution of sodium hydroxide, ammonium hydroxide or the like.

In another embodiment, the basic, anionic exchange resin is a tertiary amine anion exchange resin. Tertiary amine anion exchange resins contemplated for use in the practice of the invention include, for example, tertiary-aminated styrene-divinylbenzene copolymers, tertiary-aminated crosslinked styrene polymers, tertiary-aminated phenol-formaldehyde resins, tertiary-aminated benzene-formaldehyde resins, and mixtures thereof. In a further embodiment, the basic, anionic exchange resin is a quaternary amine anion exchange resin, or mixtures of these and other exchange resins.

The first and second ion exchange resins may contact the aqueous dispersion either simultaneously, or consecutively. For example, in one embodiment both resins are added simultaneously to an aqueous dispersion of an electrically conducting polymer, and allowed to remain in contact with the dispersion for at least about 1 hour, e.g., about 2 hours to about 20 hours. The ion exchange resins can then be removed from the dispersion by filtration. The size of the filter is chosen so that the relatively large ion exchange resin particles will be removed while the smaller dispersion particles will pass through. Without wishing to be bound by theory, it is believed that the ion exchange resins quench polymerization and effectively remove ionic and non-ionic impurities and most of unreacted monomer from the aqueous dispersion. Moreover, the basic, anion exchange and/or acidic, cation exchange resins renders the acidic sites more basic, resulting in increased pH of the dispersion. In general, about one to five grams of ion exchange resin is used per gram of conducting polymer/polymeric acid colloid.

The conductivity of the organic formulation of conductive polymer/polymeric acid colloids increases with the amount of organic liquid in the liquid medium. Conductivities as high as 3 S/cm have been achieved. In one embodiment, compositions having higher conductivities are useful for electronics applications such as electrochromic displays, thin film transistor, field effect resistance devices, memory storage, and coatings for electromagnetic shielding and anti-static applications.

The viscosity of the organic formulation of conductive polymer/polymeric acid colloids increases with the amount of organic liquid in the liquid medium. Higher viscosities can be useful in some methods for applying the material to a surface. For example, ink jet printing requires a well-defined range of viscosities. This range is usually higher than the viscosity of a typical aqueous dispersion of polypyrrole or polythiophene and polymeric acid colloids. The organic formulations can achieve the necessary viscosity.

In another embodiment, even more conductive dispersions are formed by the addition of highly conductive additives to the organic formulations of conductive polymer and colloid-forming polymeric acid. Examples of suitable conductive additives include, but are not limited to conductive polymers, metal particles and nanoparticles, metal nanowires, carbon nanotubes, carbon nanoparticles, graphite fibers or particles, carbon particles, and combinations thereof. A dispersing agent may be included to facilitate dispersing of the conductive additives.

In one embodiment, the new compositions are deposited to form electrically conductive or semiconductive layers which are used alone, or in combination with other electroactive materials, as electrodes, electroactive elements, photoactive elements, or bioactive elements. As used herein, the terms "electroactive element", "photoactive element" and "bioactive element" refer to elements which exhibit the named activity in response to a stimulus, such as an electromagnetic field, an electrical potential, solar energy radiation, and a biostimulation field.

In one embodiment, the new compositions are deposited to form buffer layers in an electronic device. The term "buffer layer" as used herein, is intended to mean an electrically conductive or semiconductive layer which can be used between an anode and an active organic material. A buffer layer is believed to accomplish one or more function in an organic electronic device, including, but not limited to planarization of the underlying layer, hole transport, hole injection, scavenging of impurities, such as oxygen and metal ions, among other aspects to facilitate or to improve the performance of an organic electronic device.

In one embodiment, there are provided buffer layers deposited from organic formulations of conductive polymer/polymeric acid colloids. In one embodiment, the buffer layers are deposited from organic formulations comprising colloid-forming polymeric sulfonic acid. In one embodiment, the buffer layer is deposited from an organic formulation containing fluorinated polymeric acid colloids. In another embodiment, the fluorinated polymeric acid colloids are fluorinated polymeric sulfonic acid colloids. In still another embodiment, the buffer layer is deposited from an organic formulation containing a conductive polymer having Formula I or Formula II and perfluoroethylenesulfonic acid colloids.

In another embodiment, there are provided buffer layers deposited from organic formulations comprising at least one conductive polymer having Formula I or Formula II and at least one colloid-forming polymeric acids blended with other water soluble or dispersible materials. Depending on the final application of the material, examples of types of additional water soluble or dispersible materials which can be added include, but are not limited to polymers, dyes, coating aids, carbon nanotubes, metal nanowires and nanoparticles, organic and inorganic conductive inks and pastes, charge transport materials, piezoelectric, pyroelectric, or ferroelectric oxide nano-particles or polymers, photoconductive oxide nanoparticles or polymers, dispersing agents, crosslinking agents, and combinations thereof. The materials can be simple molecules or polymers. Examples of suitable other water soluble or dispersible polymers include, but are not limited to, polyacrylamide, polyvinylalcohol, poly(2-vinylpridine), poly(vinylacetate), poly(vinylmethylether), poly(vinylpyrrolidone), poly(vinylbutyral), poly(styrenesulfonic acid, colloid-forming polymeric acids as discussed above, and conductive polymers such as polythiophenes, polyanilines, polyamines, polypyrroles, polyacetylenes, and combinations thereof. The additional materials can be added during polymerization, after polymerization and before reformulation, or after reformulation with at least one high boiling organic liquid.

In another embodiment, there are provided electronic devices comprising at least one electrically conductive or semiconductive layer made from the new composition. Organic electronic devices that may benefit from having one or more layers comprising the composition of at least one polythiophene having Formula I(a) or Formula I(b), and at least one colloid-forming polymeric acids and include, but are not limited to, (1) devices that convert electrical energy into radiation (e.g., a light-emitting diode, light emitting diode display, or diode laser), (2) devices that detect signals through electronics processes (e.g., photodetectors (e.g., photoconductive cells, photoresistors, photoswitches, phototransistors, phototubes), IR detectors), (3) devices that convert radiation into electrical energy, (e.g., a photovoltaic device or solar cell), and (4) devices that include one or more electronic components that include one or more organic semi-conductor layers (e.g., a transistor or diode). Other uses for the new compositions include coating materials for memory storage devices, antistatic films, biosensors, electrochromic devices, solid electrolyte capacitors, energy storage devices such as a rechargeable battery, and electromagnetic shielding applications.

In one embodiment, the organic electronic device comprises an electroactive layer positioned between two electrical contact layers, wherein at least one of the layers of the device includes the new buffer layer. One embodiment is illustrated in one type of OLED device, as shown in FIG. 1, which is a device that has anode layer 110, a buffer layer 120, an electroluminescent layer 130, and a cathode layer 150. Adjacent to the cathode layer 150 is an optional electron-injection/transport layer 140. Between the buffer layer 120 and the cathode layer 150 (or optional electron injection/transport layer 140) is the electroluminescent layer 130.

In one embodiment, the dried layers made from the new organic formulation of conductive polymer/polymeric acid colloids are not redispersible in water. In one embodiment, the organic device comprising at least one layer comprising the new composition is made of multiple thin layers. In one embodiment, the layer can be further overcoated with a layer of different water-soluble or water-dispersible material without substantial damage to the layer's functionality or performance in an organic electronic device.

The device may include a support or substrate (not shown) that can be adjacent to the anode layer 110 or the cathode layer 150. Most frequently, the support is adjacent the anode layer 110. The support can be flexible or rigid, organic or inorganic. Generally, glass or flexible organic films are used as a support. The anode layer 110 is an electrode that is more efficient for injecting holes compared to the cathode layer 150. The anode can include materials containing a metal, mixed metal, alloy, metal oxide or mixed oxide. Suitable materials include the mixed oxides of the Group 2 elements (i.e., Be, Mg, Ca, Sr, Ba, Ra), the Group 11 elements, the elements in Groups 4, 5, and 6, and the Group 8-10 transition elements. If the anode layer 110 is to be light transmitting, mixed oxides of Groups 12, 13 and 14 elements, such as indium-tin-oxide, may be used. As used herein, the phrase "mixed oxide" refers to oxides having two or more different cations selected from the Group 2 elements or the Groups 12, 13, or 14 elements. Some non-limiting, specific examples of materials for anode layer 110 include, but are not limited to, indium-tin-oxide ("ITO"), aluminum-tin-oxide, gold, silver, copper, and nickel. The anode may also comprise an organic material such as polyaniline, polythiophene, or polypyrrole. The IUPAC number system is used throughout, where the groups from the Periodic Table are numbered from left to right as 1-18 (CRC Handbook of Chemistry and Physics, 81$^{st}$ Edition, 2000).

The anode layer 110 may be formed by a chemical or physical vapor deposition process or spin-coating process. Chemical vapor deposition may be performed as a plasma-enhanced chemical vapor deposition ("PECVD") or metal organic chemical vapor deposition ("MOCVD"). Physical vapor deposition can include all forms of sputtering, including ion beam sputtering, as well as e-beam evaporation and resistance evaporation. Specific forms of physical vapor deposition include rf magnetron sputtering and inductively-coupled plasma physical vapor deposition ("IMP-PVD"). These deposition techniques are well known within the semiconductor fabrication arts.

Usually, the anode layer 110 is patterned during a lithographic operation. The pattern may vary as desired. The layers can be formed in a pattern by, for example, positioning a patterned mask or resist on the first flexible composite barrier structure prior to applying the first electrical contact layer material. Alternatively, the layers can be applied as an overall layer (also called blanket deposit) and subsequently patterned using, for example, a patterned resist layer and wet chemical or dry etching techniques. Other processes for patterning that are well known in the art can also be used. When the electronic devices are located within an array, the anode layer 110 typically is formed into substantially parallel strips having lengths that extend in substantially the same direction.

The buffer layer 120 is usually deposited onto substrates using any technique well-known to those skilled in the art.

The electroluminescent (EL) layer 130 may typically be any organic EL material, including, but not limited to, fluorescent dyes, fluorescent and phosphorescent metal complexes, conjugated polymers, and mixtures thereof. Examples of fluorescent dyes include, but are not limited to, pyrene, perylene, rubrene, derivatives thereof, and mixtures thereof. Examples of metal complexes include, but are not limited to, metal chelated oxinoid compounds, such as tris(8-hydroxyquinolato)aluminum (Alq3); cyclometalated iridium and platinum electroluminescent compounds, such as complexes of Iridium with phenylpyridine, phenylquinoline, or phenylpyridine ligands as disclosed in Petrov et al., Published PCT Application WO 02/02714, and organometallic complexes described in, for example, published applications US 2001/0019782, EP 1191612, WO 02/15645, and EP 1191614; and mixtures thereof. Electroluminescent emissive layers comprising a charge carrying host material and a metal complex have been described by Thompson et al., in U.S. Pat. No. 6,303,238, and by Burrows and Thompson in published PCT applications WO 00/70655 and WO 01/41512. Examples of conjugated polymers include, but are not limited to poly(phenylenevinylenes), polyfluorenes, poly (spirobifluorenes), polythiophenes, poly(p-phenylenes), copolymers thereof, and mixtures thereof.

The particular material chosen may depend on the specific application, potentials used during operation, or other factors. The EL layer 130 containing the electroluminescent organic material can be applied using any number of techniques including vapor deposition, solution processing techniques or thermal transfer. In another embodiment, an EL polymer precursor can be applied and then converted to the polymer, typically by heat or other source of external energy (e.g., visible light or UV radiation).

Optional layer 140 can function both to facilitate electron injection/transport, and can also serve as a confinement layer to prevent quenching reactions at layer interfaces. More specifically, layer 140 may promote electron mobility and reduce the likelihood of a quenching reaction if layers 130 and 150 would otherwise be in direct contact. Examples of materials for optional layer 140 include, but are not limited to, metal-chelated oxinoid compounds (e.g., Alq$_3$ or the like); phenanthroline-based compounds (e.g., 2,9-dimethyl-4,7-diphenyl-1,10-phenanthroline ("DDPA"), 4,7-diphenyl-1,10-phenanthroline ("DPA"), or the like); azole compounds (e.g., 2-(4-biphenylyl)-5-(4-t-butylphenyl)-1,3,4-oxadiazole ("PBD" or the like), 3-(4-biphenylyl)4-phenyl-5-(4-t-butylphenyl)-1,2,4-triazole ("TAZ" or the like); other similar compounds; or any one or more combinations thereof.

Alternatively, optional layer 140 may be inorganic and comprise BaO, LiF, Li$_2$O, or the like.

The cathode layer 150 is an electrode that is particularly efficient for injecting electrons or negative charge carriers. The cathode layer 150 can be any metal or nonmetal having a lower work function than the first electrical contact layer (in this case, the anode layer 110). As used herein, the term "lower work function" is intended to mean a material having a work function no greater than about 4.4 eV. As used herein, "higher work, function" is intended to mean a material having a work function of at least approximately 4.4 eV.

Materials for the cathode layer can be selected from alkali metals of Group 1 (e.g., Li, Na, K, Rb, Cs,), the Group 2 metals (e.g., Mg, Ca, Ba, or the like), the Group 12 metals, the lanthanides (e.g., Ce, Sm, Eu, or the like), and the actinides (e.g., Th, U, or the like). Materials such as aluminum, indium, yttrium, and combinations thereof, may also be used. Specific non-limiting examples of materials for the cathode layer 150 include, but are not limited to, barium, lithium, cerium, cesium, europium, rubidium, yttrium, magnesium, samarium, and alloys and combinations thereof.

The cathode layer 150 is usually formed by a chemical or physical vapor deposition process. In general, the cathode layer will be patterned, as discussed above in reference to the anode layer 110. If the device lies within an array, the cathode layer 150 may be patterned into substantially parallel strips, where the lengths of the cathode layer strips extend in substantially the same direction and substantially perpendicular to the lengths of the anode layer strips. Electronic elements called pixels are formed at the cross points (where an anode layer strip intersects a cathode layer strip when the array is seen from a plan or top view).

In other embodiments, additional layer(s) may be present within organic electronic devices. For example, a layer (not shown) between the buffer layer 120 and the EL layer 130 may facilitate positive charge transport, band-gap matching of the layers, function as a protective layer, or the like. Similarly, additional layers (not shown) between the EL layer 130 and the cathode layer 150 may facilitate negative charge transport, band-gap matching between the layers, function as a protective layer, or the like. Layers that are known in the art can be used. In addition, any of the above-described layers can be made of two or more layers. Alternatively, some or all of inorganic anode layer 110, the buffer layer 120, the EL layer 130, and cathode layer 150, may be surface treated to increase charge carrier transport efficiency. The choice of materials for each of the component layers may be determined by balancing the goals of providing a device with high device efficiency with the cost of manufacturing, manufacturing complexities, or potentially other factors.

The different layers may have any suitable thickness. In one embodiment, inorganic anode layer 110 is usually no greater than approximately 500 nm, for example, approximately 10-200 nm; buffer layer 120, is usually no greater than approximately 250 nm, for example, approximately 50-200 nm; EL layer 130, is usually no greater than approximately 1000 nm, for example, approximately 50-80 nm; optional layer 140 is usually no greater than approximately 100 nm, for example, approximately 20-80 nm; and cathode layer 150 is usually no greater than approximately 100 nm, for example, approximately 1-50 nm. If the anode layer 110 or the cathode layer 150 needs to transmit at least some light, the thickness of such layer may not exceed approximately 100 nm.

Depending upon the application of the electronic device, the EL layer 130 can be a light-emitting layer that is activated by signal (such as in a light-emitting diode) or a layer of material that responds to radiant energy and generates a signal with or without an applied potential (such as detectors or voltaic cells). Examples of electronic devices that may respond to radiant energy are selected from photoconductive cells, photoresistors, photoswitches, biosensors, phototransistors, and phototubes, and photovoltaic cells. After reading this specification, skilled artisans will be capable of selecting material(s) that are suitable for their particular applications. The light-emitting materials may be dispersed in a matrix of another material, with or without additives, or form a layer alone. The EL layer 130 generally has a thickness in the range of approximately 50-500 nm. In one embodiment, EL layer 130 has a thickness less than approximately 200 nm.

In organic light emitting diodes (OLEDs), electrons and holes, injected from the cathode 150 and anode 110 layers, respectively, into the EL layer 130, form negative and positively charged polarons in the polymer. These polarons migrate under the influence of the applied electric field, forming a polaron exciton with an oppositely charged species and subsequently undergoing radiative recombination. A sufficient potential difference between the anode and cathode, usually less than approximately 12 volts, and in many instances no greater than approximately 5 volts, may be applied to the device. The actual potential difference may depend on the use of the device in a larger electronic component. In many embodiments, the anode layer 110 is biased to a positive voltage and the cathode layer 150 is at substantially ground potential or zero volts during the operation of the electronic device. A battery or other power source(s) may be electrically connected to the electronic device as part of a circuit but is not illustrated in FIG. 1.

In one embodiment, the buffer layers comprising the new composition have lower moisture uptake and thus less water is included in the device fabrication process. This lower moisture level can also result in better operating lifetime for the device and reduced corrosion.

The fabrication of full-color or area-color displays using two or more different light-emitting materials becomes complicated if each light-emitting material requires a different cathode material to optimize its performance. Display devices are made up of a multiplicity of pixels which emit light. In multicolor devices there are at least two different types of pixels (sometimes referred to as sub-pixels) emitting light of different colors. The sub-pixels are constructed with different light-emitting materials. It is very desirable to have a single cathode material that gives good device performance with all of the light emitters. This minimizes the complexity of the device fabrication. In multicolor devices where the buffer layer is made from the organic formulations of the invention, it may be possible to use a common cathode while maintaining good device performance for each of the colors. The cathode can be made from any of the materials discussed above; and may be barium, overcoated with a more inert metal such as aluminum.

Other organic electronic devices that may benefit from having one or more layers comprising the new compositions include (1) devices that convert electrical energy into radiation (e.g., a light-emitting diode, light emitting diode display, or diode laser), (2) devices that detect signals through electronics processes (e.g., photodetectors (e.g., photoconductive cells, photoresistors, photoswitches, phototransistors, phototubes), IR detectors), (3) devices that convert radiation into electrical energy, (e.g., a photovoltaic device or solar cell), and (4) devices that include one or more electronic components that include one or more organic semi-conductor layers (e.g., a transistor or diode). Other uses for the new compositions include coating materials for memory storage devices, biosensors, electrochromic devices, anti-static applications and electromagnetic shielding applications.

In such devices, the layer, which may be a buffer layer, can further be overcoated with a layer of conductive polymer applied from aqueous solution or solvent. The conductive polymer can facilitate charge transfer and also improve coatability. Examples of suitable conductive polymers include, but are not limited to, polyanilines, polythiophenes, polydioxythiophene/-polystyrenesulfonic acid, polyaniline/polymeric-acid-colloids such as those disclosed in co-pending application Ser. No. 10/669,577, polythiophene/polymeric-acid-colloids such as those disclosed in co-pending application Ser. No. 10/669,494, polypyrroles, polyacetylenes, and combinations thereof. The composition comprising such a layer may further comprise conductive polymers, and may also comprise dyes, carbon nanotubes, carbon nanoparticles, metal nanowires, metal nanoparticles, carbon fibers and particles, graphite fibers and particles, coating aids, organic and inorganic conductive inks and pastes, charge transport materials, semiconductive or insulating inorganic oxide particles, piezoelectric, pyroelectric, or ferroelectric oxide nano-particles or polymers, photoconductive oxide nanoparticles or polymers, dispersing agents, crosslinking agents and combinations thereof. These materials can be added to the new composition either before or after polymerization of the monomer and/or before or after treatment with at least one ion exchange resin.

In yet another embodiment of the invention, there are provided thin film field effect transistors comprising electrodes made from compositions comprising polypyrrole, polythiophene or mixtures thereof, polymers, at least one colloid-forming polymeric acid, and at least one organic liquid. In one embodiment, the colloid-forming polymeric acid comprises colloid-forming polymeric sulfonic acids. For use as electrodes in thin film field effect transistors, new composition must be selected so as to avoid re-dissolution of the other components in the transistor. Thin film field effect transistor electrodes fabricated from conducting polymers should have a conductivity greater than 10 S/cm. Thus, in one embodiment, the electrodes are made from organic formulations of conductive polymers and colloid-forming polymeric sulfonic acids in combination with electrical conductivity enhancers such as metal nanowires, metal particles, metal nanoparticles, carbon nanotubes, graphite particle , graphite fibers, and mixtures thereof. Invention compositions may be used in thin film field effect transistors as gate electrodes, drain electrodes, or source electrodes.

Figure 2:
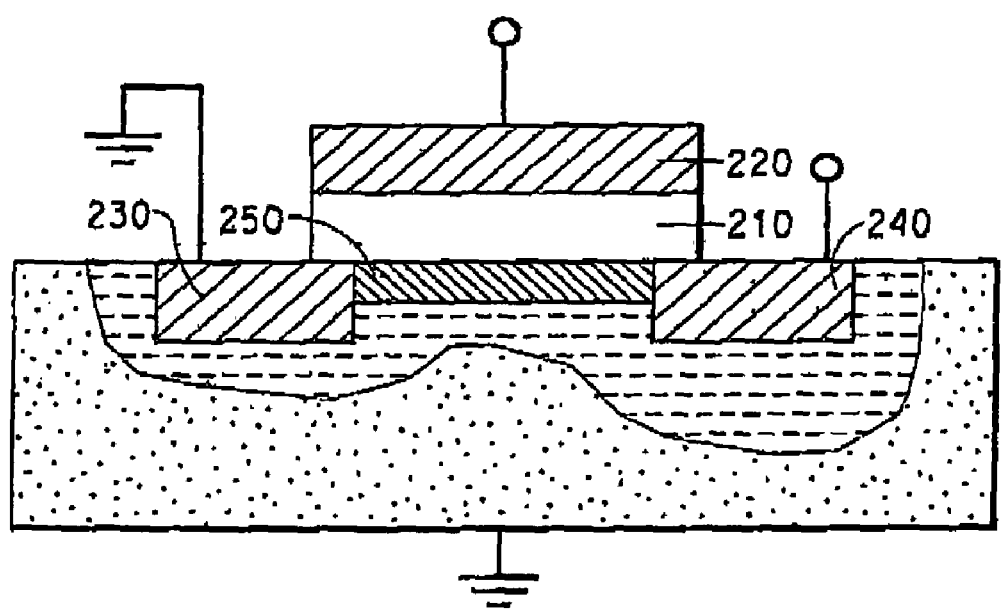
FIG. 2 illustrates another use of the new composition and is a cross-sectional view of a thin film field effect transistor that includes an electrode comprising the new composition.

Thin film field effect transistors, as shown in FIG. 2, are typically fabricated in the following manner. A dielectric polymer or dielectric oxide thin film 210 has a gate electrode 220 on one side and drain and source electrodes, 230 and 240, respectively, on the other side. Between the drain and source electrode, an organic semiconducting film 250 is deposited. Invention aqueous dispersions containing nanowires or carbon nanotubes are ideal for the applications of gate, drain and source electrodes because of their compatibility with organic based dielectric polymers and semiconducting polymers in solution thin film deposition. Since the invention conducting compositions, e.g., polypyrrole or polythiophene and colloidal perfluoroethylene sulfonic acid, exist as a colloidal dispersion, less weight percentage of the conductive fillers is required (relative to compositions containing water soluble polymeric sulfonic acids) to reach percolation threshold for high electrical conductivity.

In another embodiment, there are provided field effect resistance devices comprising one layer comprising at least one conductive polymer having Formula I or Formula II and at least one colloid-forming polymeric sulfonic acid. The field effect resistance devices undergo a reversible change of resistance in the conducting polymer films when subjected to a pulse of gate voltage, as illustrated in pages 339-343, No. 2, 2002, Current Applied Physics.

In another embodiment, there are provided electrochromic displays comprising at least one layer made from organic formulations of conductive polymer/colloid-forming polymeric acid. Electrochromic displays utilize change of color when thin film of the material is subjected to electrical potential. In one embodiment electrically conductive polymer/polymeric acid colloids of the new composition are superior materials for this application because of the high pH of the dispersion, and the low moisture uptake and water non-dispersibility of dried solid films made from the dispersions.

In yet another embodiment of the invention, there are provided memory storage devices comprising silicon chips top-coated with organic formulations of conductive polymers and colloid-forming polymeric sulfonic acids. When information is recorded, higher voltages at certain points in the circuit grids of silicon chips destroys the conductive polymer at those points to create "zero" bit data. The conductive polymer at the untouched points remains electrically conductive and becomes "1" bit data. Organic formulations of conductive polymer/polymeric acid colloids of this invention can form superior materials for this application because of the low moisture uptake and water non-dispersibility of dried solid films made from the dispersions.

For example, a write-once-read-many-times (WORM) memory is known in the art (Nature, page 166 to 169, vol. 426, 2003).

In another embodiment of the invention, the organic formulations of conductive polymers and polymeric acid colloids are used to form coatings for biosensor, electrochromic, or electromagnetic shielding, anti-static, solid electrolyte capacitors, and anti-corrosion applications.

The invention will now be described in greater detail by reference to the following non-limiting examples.

EXAMPLES

Example 1

This example illustrates the reformulation of [poly(3,4-ethylenedioxythiophene)]/Nafion® with ethylene glycol to form an organic formulation, "PEDT/Nafion®-EG", and the effect this has on electrical conductivity. A 25% (w/w) aqueous colloidal dispersion of perflurorethylenesulfonic acid with an EW of 1050 was made using a procedure similar to the procedure in U.S. Pat. No. 6,150,426, Example 1, Part 2, except that the temperature was approximately 270° C. The dispersion was diluted with water to form a 12.5% (w/w) dispersion for the polymerization.

To a 500 mL reaction kettle fitted with an electrically controlled propeller type-stirring paddle were added 63.75 g (7.28 mmoles of Nafion® monomer units) of the Nafion® polymer dispersion, 125 g de-ionized water, 45 mg (0.087 mmoles) ferric sulfate (Aldrich, Cat. #307718), and 0.125 mL (1.49 mmoles) 37% (w/w) aqueous hydrochloric acid (Ashland Chemicals, Columbus, Ohio.; cat #3471440) and the reaction mixture stirred at 200 RPM. 0.281 mL (2.64 mmol) of freshly distilled 3,4-ethylenedioxythiophene (H. C. Starck, Leverkusen, Germany) monomer were placed in a 1 mL syringe on an automatic syringe pump. The syringe was fitted with a tube which was led into the reaction vessel and the tube end submerged ~1" below the surface of the reaction mixture. Oxidizing solution made of 0.69 g (2.9 mmoles) sodium persulfate (Fluka, cat. #71889) in 10 mL de-ionized water was placed in a 10 mL syringe with small tube leading from the syringe and into the reaction vessel, with the end of the tube approximately 4" above the reaction mixture. The syringe was placed on a second automatic syringe pump. The injection of the oxidizing solution was started after ~15 min of stirring at the rate of 0.833 mL/h. About 40 min after the injection of the oxidizing solution was started, the injection of monomer was started at the rate of 20 μL/h. About thirty minutes after the monomer injection was started, the solution started turning color, from colorless to light blue and then dark blue. Addition of both the monomer and the oxidizing agent solution took about 10 hours to complete. Polymerization and addition of both the monomer and the oxidizing agent solution were all done at ambient temperature. Within 20 hrs from the start of pumping oxidizing agent, particle size count measured with an Accusizer (Model 780A, Particle sizing System, Santa Barbara, Calif.) was 4.2 million particles in each 1 mL of dispersion where the particles are greater than 0.75 μm. The reaction mixture was allowed to proceed for another three hours and forty minutes before adding 7 g Amberlyst-15 acid exchange resin, 12 g Amberjet 4400 base exchange resin and 42 g n-propanol. Both exchange resins were washed first prior to the use. Amberjet 4400 is a strong base quaternary ammonium gel resin from Rohm Haas Company (Philadelphia, Pa., USA). Amberlyst-15 is a strong sulfonic acid macroreticular resin from Rohm Haas Company. The reaction mixture containing the resin was stirred for three and one half hours and then filtered through two pieces of Whatman #54 filter paper. Particle size count was 2.1 million particles in each 1 mL of dispersion where the particles were greater than 0.75 μm. The dispersion was very stable without any sign of sedimentation. pH of the dispersion is 2.2 measured with a pH meter.

A few drops of the dispersion were deposited on a microscope slide and left to dry in ambient conditions before being placed in a vacuum oven set at 90° C. The oven was constantly pumped in a small amount of nitrogen. Once baked, the dried films having thickness of ~4 μm were painted with approximately 0.4 cm parallel vertical lines with a separation of about 0.15 cm between each parallel line. The film thickness was measured with a Surface Profiler (model# Alpha-Step 500) from Tencor Instruments (san Jose, Calif., USA). Resistance was then measured Keithley 2420 Source Meter at ambient temperature by applying voltage between 1 and −1 volt. Average conductivity of five samples was 0.1 S/cm. It should be pointed out that the films used for resistance measurement do not re-disperse in water.

25.94 g of the dispersion made above was centrifuged for four hours with an Allegra™ 64R centrifuge set at a speed of 15,500 rpm. The clear liquid on the top after the centrifuge was decant leaving behind 6.50 g wet solids. 1.409 g of the wet solid, which contains about 0.225 g dry solid and 1.184 g mixture of water and n-propanol, was mixed with 14.7732 g ethylene glycol (Fluka Chemica). The mixture was stirred with a magnetic stirrer and quickly formed a smooth dispersion. The reformulated dispersion on contains about 1.4% (w/w) PEDOT/Nafion® 91.3% ethylene glycol. Remaining % is predominantly water/n-propanol mixture. Couple drops of the reformulated dispersion was then spread on a microscope slide, which was left dried on a hot-plate set at approximately 50° C. in air first before baked in a vacuum oven at the same time as the films made from PEDOT/Nafion® described above. Resistance of the baked films having thickness of ~5 μm was measure for resistance as described above. Average conductivity was 3.0 S/cm. The conductivity upon reformulation with ethylene glycol shows 300 times increase in conductivity. The conductivity has approached the level where application for thin film transistor as drain, gate and source electrodes becomes possible. It should also be point that the reformulated dried films do not re-disperse in water.

The resistance-tested samples were immersed in water and there was no sign of re-dispersing in water even after many days of immersion. The unique property combined with high conductivity is useful for memory Example 2

This example illustrates the reformulation of polypyrrole/Nafion® with dimethylacetamide to form an organic formulation, "PPy/Nafion®-DMAC", and the effect on electrical conductivity. The Nafion® was the same as used in Example 1.

To a 500 mL reaction kettle fitted with an electrically controlled propeller type-stirring paddle were added 64.6 g (7.38 mmoles of Nafion® monomer units) of the Nafion® polymer dispersion, 125 g de-ionized water, 62 mg ferric sulfate (Aldrich, Cat. #307718), and 0.175 mL (2.10 mmoles) 37% (w/w) aqueous hydrochloric acid (Ashland Chemicals, Columbus, Ohio; cat #3471440). The reaction mixture stirred at 200 RPM. After 5 minutes of stirring, an addition of 0.253 mL (3.58 mmoles) of freshly distilled pyrrole (Across Organics, cat. #157711000) resulted in a rapid color change of the reaction mixture from clear to dark green. After another 5 minutes of stirring, a slow injection of an oxidizing solution made of 1.01 g (4.24 mmoles) sodium persulfate (Fluka, cat. #71889) in 10 mL de-ionized water was started at the rate of 1.0 mL/h. This was accomplished by leading a small tube from a 10 mL syringe on an automatic syringe pump into the reaction vessel with the end of the tube approximately 4" above the reaction mixture. As the oxidizer was added to the reaction mixture its color turned from dark green to greenish-brown. Addition of the oxidizing agent solution took about 10 hours to complete. Polymerization and addition of the oxidizing agent solution were all done at ambient temperature. By the end of the addition, particle size count measured with an Accusizer (Model 780A, Particle Sizing Systems, Santa Barbara, Calif.) was 1.2 million particles in each 1 mL of dispersion where the particles are greater than 0.75 μm. The reaction mixture was allowed to proceed for another seven and one half hours before adding 15 g Lewatit Monoplus S100, 15 g Lewatit MP62WS and 20 g n-propanol. Lewatit Monoplus S100 is a trade name from Bayer, Pittsburgh, for sodium sulfonate of crosslinked polystyrene ion exchange resin. Lewatit MP62WS is a trade name from Bayer for free base/chloride of tertiary/quaternary amine of crosslinked polystyrene. The two resins were washed first before use with deionized water separately until there was no color in the water. The reaction mixture containing the resins was stirred for four and one half hours and then filtered through two pieces of Whatman #54 filter paper. Particle size count was 0.75 million particles in each 1 mL of dispersion where the particles were greater than 0.75 μm. The dispersion was very stable without any sign of sedimentation. pH of the dispersion was 5.4 measured with a pH meter. A small portion of the dispersion was dried with a flowing stream of nitrogen to form solid films for solid percentage. It was determined to be 4.1%.

A few drops of the dispersion made above were spread on a microscope slide, which was left to dry in ambient conditions before being placed in a vacuum oven set at 85° C. for one hour. The oven was constantly pumped in a small amount of nitrogen. Once baked, the dried films having thickness of ~8 μm were painted with approximately 0.4 cm parallel vertical lines with a separation of about 0.15 cm between each two parallel lines. Resistance was then measured at ambient temperature by applying voltage between 1 and −1 volt. Average conductivity of five samples was $1.0 \times 10^{-5}$ S/cm. It should be pointed out that the films used for resistance measurement do not re-disperse in water.

31.86 g of the dispersion made above was centrifuged for four hours with an Allegra™ 64R centrifuge set at a speed of 15,500 rpm. The amount of dispersion contains 1.3063 g dried solid of PPy/Nafion®. The clear liquid on the top after the centrifuge was determined for solid % and was used to calculate the amount of solid in the clear liquid. The wet solid weighed 1.91 g, but only contained 0.45 g dried solid. Portion of the wet solid was used in Example 3.

0.7638 g of the wet solid, which contains about 0.18 g dry solid and 0.584 g mixture of water and n-propanol, was mixed with 9.234 g dimethylacetamide (Aldrich, Cat#270555). The mixture was stirred with a magnetic stirrer and quickly formed a smooth dispersion. The reformulated dispersion on contains about 1.8% (w/w) PPy/Nafion®, 92.34% dimethylacetamide. Couple drops of the reformulated dispersion was then spread on a microscope slide which was placed in a vacuum oven set at 50° C. until deposited films were dried. The oven was constantly pumped in a small amount of nitrogen. The temperature was then raised to 85° C. and baked for one hour. Resistance of the baked films having thickness of ~4 μm was measure for resistance as described above. Average conductivity was $2.7 \times 10^{-2}$ S/cm. The conductivity upon reformulation with dimethylacetamide shows three orders of magnitude increase in conductivity. The resistance-tested samples were immersed in water and there was no sign of re-dispersing in water even after many days of immersion.

Example 3

This example illustrates the reformulation of polypyrrole/Nafion® with ethylene glycol (EG) to form an organic formulation, "PPy/Nafion®-EG", and the effect on electrical conductivity.

0.7640 g of the wet solid prepared in Example 2, which contains about 0.18 g dry solid and 0.584 g mixture of water and n-propanol, was mixed with 9.234 g ethylene glycol (Fluka Chemika). The mixture was stirred with a magnetic stirrer and quickly formed a smooth dispersion. The reformulated dispersion on contains about 1.8% (w/w) PPy/Nafion®, 92.34% ethylene glycol. Couple drops of the reformulated dispersion was then spread on a microscope slide which was placed in a vacuum oven set at 50° C. until deposited films were dried. The oven was constantly pumped in a small amount of nitrogen. The temperature was then raised to 85° C. and baked for one hour. Resistance of the baked films having thickness of ~4 μm was measure for resistance as described above. Average conductivity was $8.5 \times 10^{-2}$ S/cm. The conductivity upon reformulation with ethylene shows almost four orders of magnitude increase in conductivity. The resistance-tested samples were immersed in water and there was no sign of re-dispersing in water even after many days of immersion.

Example 4

Another example illustrates another preparation of PEDOT/Nafion® and the reformulation with ethylene glycol.

An aqueous dispersion of chemical names that fit the words used in the claims used for this example was prepared as follows: 0.309 ml (2.902 mmoles) of Baytron-M (a trade name for 3,4ethylenedioxythiophene) from H. C. Starck GmbH (Leverkusen, Germany) was predissolved in 229.12 g deionized water at 20° C. for one hour in a 500 ml jacketed three-necked round bottom flask equipped with a stirrer at a speed of 175 rpm. 69.52 g (8.0 mmoles of Nafion® monomer units) DE1021 (E. I. du Pont de Nemours and Company (Wilmington, Del., USA; EW: 999 g/mole acid) Nafion® was then massed into the mixture. As soon as the Nafion® was added, 0.84 g (3.538 mmoles) sodium persulfate predissolved in 10 g deionized water was added to the reaction vessel. 0.95 g (7.1 mmoles) of a stock solution of ferric sulfate was then added. The stock solution of ferric sulfate was made first by dissolving 0.0141 g ferric sulfate hydrate (97%, Aldrich cat. #30,771-8) with deionized water to a total weight of 3.6363 g. The polymerization was allowed to proceed with stirring at about 20° C. controlled by circulation fluid. The polymerization liquid started to turn blue in 13 minutes. The reaction was terminated in 14 hours by adding 11.03 g Lewatit® S100, a trade name from Bayer, Pittsburgh, Pa., for sodium sulfonate of crosslinked polystyrene, and 11.03 g Lewatit® MP62 WS, a trade from Bayer, Pittsburgh, Pa., for free base/chloride of tertiary/quaternary amine of crosslinked polystyrene. The two resins were washed first before use with deionized water separately until there was no color in the water. The resin treatment proceeded for about 6 hrs. The resulting slurry was then suction-filtered through a Whatman #54 filter paper. It went through the filter paper very fast. Yield was 268 g. Solid % was about 2.8% (w/w) based on added polymerization ingredients. pH of the aqueous PEDT/Nafion® was determined to be 4.64 with a 315 pH/Ion meter from Corning Company (Corning, N.Y., USA).

A few drops of the dispersion made above were spread on a microscope slide, which was left to dry in ambient conditions before being placed in a vacuum oven set at 90° C. for 30 minutes. The oven was constantly pumped in a small amount of nitrogen. Once baked, the dried films having thickness of ~2 μm were painted with approximately 0.4 cm parallel vertical lines with a separation of about 0.15 cm between each two parallel lines. Resistance was then measured at ambient temperature by applying voltage between 1 and −1 volt. Average conductivity of five samples was $1.1 \times 10^{-5}$ S/cm. It should be pointed out that the films used for resistance measurement do not re-disperse in water.

30 g of the dispersion made above was centrifuged for 10 hours with an Allegra™ 64R centrifuge set at a speed of 15,500 rpm. The amount of dispersion represents 0.84 g dried solid of PPy/Nafion®. The clear liquid on the top after the centrifuge was decanted leaving behind 7.34 g wet solids. 2.95 g of the wet solid, which contains about 0.4 g dry solid and 2.55 g water, was mixed with 10.84 g ethylene glycol (Fluka Chemica, Cat#0370). The mixture was stirred with a magnetic stirrer and quickly formed a smooth dispersion. The reformulated dispersion on contains about 2.9% (w/w) PEDOT/Nafion®, 78.6% ethylene glycol. The remaining % is predominantly water. Films preparation and resistance are described for 5% ethylene glycol. Once baked, the dried films having thickness of ~4 µm were painted with approximately 0.4 cm parallel vertical lines with a separation of about 0.152 cm between each two parallel lines. Resistance was then measured at ambient temperature by applying voltage between 1 and −1 volt. Average conductivity of five samples was $1.9 \times 10^{-3}$ S/cm. The conductivity is about 2,000 times the conductivity of the films made from PEDOT/Nafion®.

What is claimed is:

1. A composition comprising at least one polymer selected from the group consisting of a polypyrrole, a polythiophene, and a combination of such polymers, and at least one colloid-forming fluorinated polymeric sulfonic acid dispersed in a liquid medium comprising at least 60% by weight at least one organic liquid.

2. The composition according to claim 1, wherein said polypyrrole has Formula I

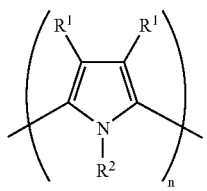

(I)

and said polythiophene has Formula II

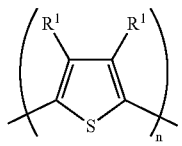

(II)

where in Formula I and Formula II:
$R^1$ is independently selected so as to be the same or different at each occurrence and is selected from the group consisting of hydrogen, alkyl, alkenyl, alkoxy, alkanoyl, alkythio, aryloxy, alkylthioalkyl, alkylaryl, arylalkyl, amino, alkylamino, dialkylamino, aryl, alkylsulfinyl, alkoxyalkyl, alkylsulfonyl, arylthio, arylsulfinyl, alkoxycarbonyl, arylsulfonyl, acrylic acid, phosphoric acid, phosphonic acid, halogen, nitro, cyano, hydroxyl, epoxy, silane, siloxane, alcohol, amidosulfonate, benzyl, carboxylate, ether, ether carboxylate, ether sulfonate, and urethane; or both $R^1$ groups together may form an alkylene or alkenylene chain completing a 3, 4, 5, 6, or 7-membered aromatic or alicyclic ring, which ring may optionally include one or more atoms selected from the group consisting of divalent nitrogen, sulfur and oxygen atoms; and
n is at least 4;
where in Formula I:
$R^2$ is independently selected so as to be the same or different at each occurrence and is selected from the group consisting of hydrogen, alkyl, alkenyl, aryl, alkanoyl, alkylthioalkyl, alkylaryl, arylalkyl, amino, epoxy, silane, siloxane, alcohol, amidosulfonate, benzyl, carboxylate, ether, ether carboxylate, ether sulfonate, sulfonate, and urethane.

3. The composition according to claim 2, wherein the polymer is a polypyrrole having Formula I and $R^1$ and $R^2$ are hydrogen.

4. The composition according to claim 2, wherein both $R^1$ together form a 6- or 7-membered alicyclic ring, which is further substituted with a group selected from the group consisting of alkyl, heteroalkyl, alcohol, amidosulfonate, benzyl, carboxylate, ether, ether carboxylate, ether sulfonate, sulfonate, and urethane.

5. The composition according to claim 2, wherein the polymer is a polythiophene having Formula II and $R^1$ together form —O—$(CHY)_m$—O—, where m is 2 or 3, and Y is the same or different at each occurrence and is selected from hydrogen, alkyl, alcohol, amidosulfonate, benzyl, carboxylate, ether, ether carboxylate, ether sulfonate, sulfonate, and urethane.

6. The composition according to claim 5, wherein all Y are hydrogen and m is 2.

7. The composition according to claim 1 having a pH of from 1 to 8.

8. The composition according to claim 1, wherein said composition further comprises at least one selected from the group consisting of a conductive polymer, metal particles, graphite fibers, graphite particles, carbon nanotubes, carbon nanoparticles, metal nanowires, organic conductive inks, organic conductive pastes, inorganic conductive inks, inorganic conductive pastes, charge transport materials, semiconductive inorganic oxide nano-particles, insulating inorganic oxide nano-particles, piezoelectric oxide nano-particles, piezoelectric polymers, pyrroelectric oxide nano-particles, pyrroelectric polymers, ferroelectric oxide nano-particles, ferroelectric polymers, dispersing agents, crosslinking agents and combinations thereof.

9. The composition according to claim 1, wherein said polymeric sulfonic acid comprises a perfluoroalkylenesulfonic acid.

10. A method for producing a composition comprising:
polymerizing at least one monomer selected from the group consisting of a pyrrole, a thiophene, and a combination thereof in the presence of at least one colloid-forming polymeric acid in an aqueous liquid medium, to form an aqueous dispersion,
removing an amount of aqueous liquid medium from the aqueous dispersion to form partially dried solids, and
dispersing the partially dried solids in at least one high boiling organic liquid.

11. The method according to claim 10 wherein polymerization is carried out by forming a combination of water, at least one monomer selected from the group consisting of a pyrrole, a thiophene, and mixtures thereof, at least one colloid-forming polymeric acid, and at least one selected from the group consisting of an oxidizing agent, catalyst and mixtures, in any order, provided that at least a portion of the colloid-forming polymeric acid is present when at least one of the monomer and the oxidizer, catalyst or mixture is added.

12. The method according to claim 10, wherein the colloid-forming polymeric acid is selected from polymeric sulfonic acids, polymeric carboxylic acids, polymeric acrylic acids, polymeric phosphoric acid, polymeric phosphonic acids, and mixtures thereof.

13. The method according to claim 10, wherein said pyrrole monomer has Formula Ia and said thiophene monomer has Formula IIa:

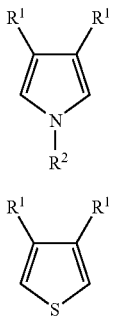

wherein in Formula Ia and Formula IIa:
   $R^1$ is independently selected so as to be the same or different at each occurrence and is selected from the group consisting of hydrogen, alkyl, alkenyl, alkoxy, alkanoyl, alkythio, aryloxy, alkylthioalkyl, alkylaryl, arylalkyl, amino, alkylamino, dialkylamino, aryl, alkylsulfinyl, alkoxyalkyl, alkylsulfonyl, arylthio, arylsulfinyl, alkoxycarbonyl, arylsulfonyl, acrylic acid, phosphoric acid, phosphonic acid, halogen, nitro, cyano, hydroxyl, epoxy, silane, siloxane, alcohol, amidosulfonate, benzyl, carboxylate, ether, ether carboxylate, ether sulfonate, and urethane; or both $R^1$ groups together may form an alkylene or alkenylene chain completing a 3, 4, 5, 6, or 7-membered aromatic or alicyclic ring, which ring may optionally include one or more atom selected from group consisting of divalent nitrogen, sulfur and oxygen atoms; and where in Formula I:
   $R^2$ is independently selected so as to be the same or different at each occurrence and is selected from the group consisting of hydrogen, alkyl, alkenyl, aryl, alkanoyl, alkylthioalkyl, alkylaryl, arylalkyl, amino, epoxy, silane, siloxane, alcohol, amidosulfonate, benzyl, carboxylate, ether, ether carboxylate, ether sulfonate, sulfonate, and urethane.

14. The method according to claim 10, wherein said organic liquid has a boiling point of at least 100° C.

15. The method according to claim 10, wherein said organic liquid is selected from the group consisting of glycols, glycol ethers, alcohols, alcohol ethers, cyclic ethers, ketones, nitriles, sulfoxides, amides, and combinations thereof.

16. The method according to claim 10, wherein said organic liquid is selected from the group consisting of N-methylpyrrolidone, ethylene glycol, dimethylacetamide, dimethyl formamide, dimethylsulfoxide, and combinations thereof.

17. The method according to claim 10, further comprising adding at least one selected from the group consisting of a conductive polymer, metal particles, graphite fibers, graphite particles, carbon nanotubes, carbon nanoparticles, metal nanowires, organic conductive inks, organic conductive pastes, inorganic conductive inks, inorganic conductive pastes, charge transport materials, semiconductive inorganic oxide nano-particles, insulating inorganic oxide nano-particles, piezoelectric oxide nano-particles, plezoelectric polymers, pyroelectric oxide nano-particles, pyroelectric polymers, ferroelectric oxide nano-particles, ferroelectric polymers, dispersing agents, crosslinking agents and combinations thereof.

18. An organic electronic device comprising a layer comprising the composition of claim 1.

19. The organic electronic device according to claim 18 wherein said device is selected from group consisting of a photosensor, photoswitch, phototransistor, photoconductive cell, photoresistor, biosensor, phototube, IR detectors, photovoltaic device, solar cell, light-emitting diode, light-emitting diode display, electrochromic display, thin film transistor, electromagnetic shielding device, photodiode, solid electrolyte capacitors, field effect resistance device, memory storage device, and diode laser.

20. The composition according to claim 1, wherein the organic liquid is 80 to 90% by weight of the liquid medium.

21. The composition according to claim 1, wherein said polypyrrole has Formula I

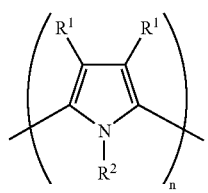

and said polythiophene has Formula II

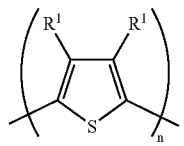

where in Formula I and Formula II:
   $R^1$ is the same or different at each occurrence and is independently selected from the group consisting of hydrogen, alkyl, alkenyl, alkoxy, cycloalkyl, cycloalkenyl, alcohol, amidosulfonate, benzyl, carboxylate, ether, ether carboxylate, ether sulfonate, sulfonate, urethane, epoxy, silane, siloxane, and alkyl substituted with one or more selected from sulfonic acid, carboxylic acid, acrylic acid, phosphoric acid, phosphonic acid, halogen, nitro, cyano, hydroxyl, epoxy, silane, and siloxane moieties;
   n is at least 4; and
where in Formula I:
   $R^2$ is independently selected so as to be the same or different at each occurrence and is selected from hydrogen, alkyl, alkenyl, aryl, alkanoyl, alkylthioalkyl, alkylaryl, arylalkyl, amino, epoxy, silane, siloxane, alcohol, amidosulfonate, benzyl, carboxylate, ether, ether carboxylate, ether sulfonate, sulfonate, and urethane.

22. The composition according to claim 1, wherein said polypyrrole has Formula I

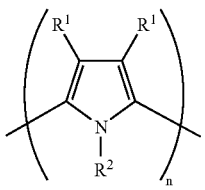

(I)

and said polythiophene has Formula II

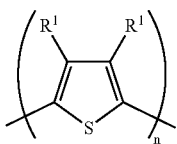

(II)

where in Formula I and Formula II:

R$^1$ is independently selected so as to be the same or different at each occurrence and is selected from the group consisting of hydrogen, alkyl, alkenyl, alkoxy, alkanoyl, alkythio, aryloxy, alkylthioalkyl, alkylaryl, arylalkyl, amino, alkylamino, dialkylamino, aryl, alkylsulfinyl, alkoxyalkyl, alkylsulfonyl, arylthio, arylsulfinyl, alkoxycarbonyl, arylsulfonyl, acrylic acid, phosphoric acid, phosphonic acid, halogen, nitro, cyano, hydroxyl, epoxy, silane, siloxane, alcohol, amidosulfonate, benzyl, carboxylate, ether, ether carboxylate, ether sulfonate, and urethane; or both R$^1$ groups together may form an alkylene or alkenylene chain completing a 3, 4, 5, 6, or 7-membered aromatic or alicyclic ring, which ring may optionally include one or more atom selected from the group consisting of divalent nitrogen, sulfur and oxygen atoms; and n is at least 4;

where in Formula I:

R$^2$ is independently selected so as to be the same or different at each occurrence and is selected from the group consisting of hydrogen, alkyl, and alkyl substituted with one or more selected from sulfonic acid, carboxylic acid, acrylic acid, phosphoric acid, phosphonic acid, halogen cyano, hydroxyl, epoxy, silane, and siloxane moieties.

* * * * *